PULSE INTERVAL TIME DIVISION SYSTEM

Filed Sept. 12, 1950 4 Sheets-Sheet 1

INVENTOR
PAUL W. BORGESON
BY Elmer J. Gorn
ATTORNEY

June 23, 1953 P. W. BORGESON 2,643,330

PULSE INTERVAL TIME DIVISION SYSTEM

Filed Sept. 12, 1950 4 Sheets-Sheet 2

INVENTOR
PAUL W. BORGESON
BY Elmer J. Gorn
ATTORNEY

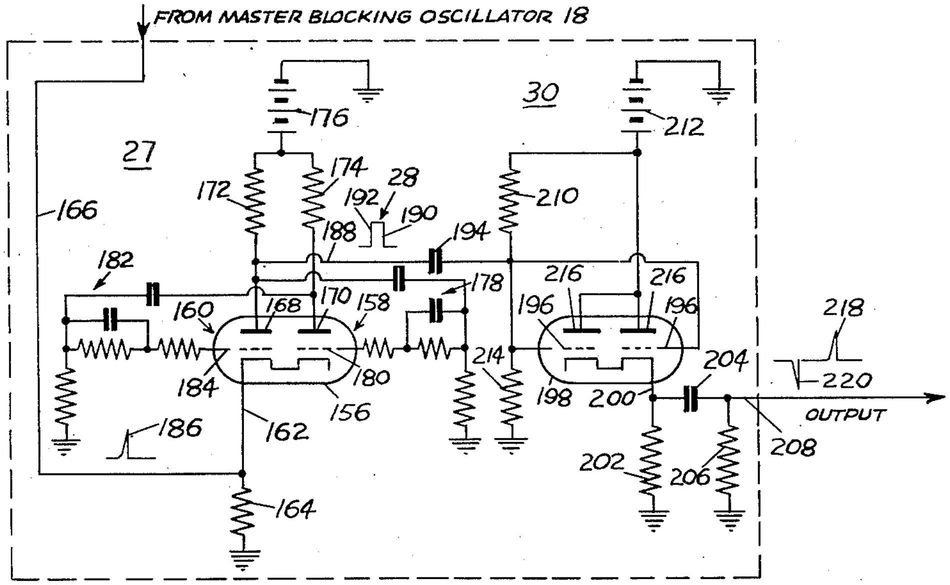
FIG. 4 COUNT DOWN MVBR 27, CATHODE FOLLOWER AND DIFFERENTIATING CIRCUITS 30 AND 104
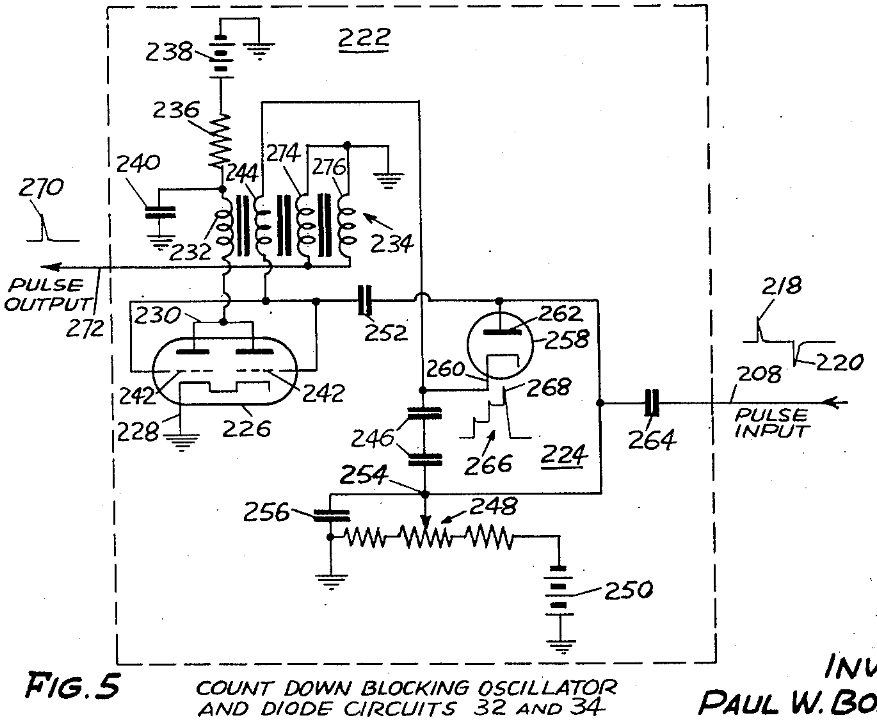
FIG. 5 COUNT DOWN BLOCKING OSCILLATOR AND DIODE CIRCUITS 32 AND 34
INVENTOR
PAUL W. BORGESON
BY Elmer J. Gorn
ATTORNEY June 23, 1953 P. W. BORGESON 2,643,330

PULSE INTERVAL TIME DIVISION SYSTEM

Filed Sept. 12, 1950 4 Sheets-Sheet 4

AMPLIFIER 20, MASTER BLOCKING OSCILLATOR 18, AMPLIFIER TUBE AND BLOCKING OSCILLATOR CIRCUIT 17

INVENTOR
PAUL W. BORGESON
BY Elmer J. Gorn
ATTORNEY

Patented June 23, 1953 2,643,330

UNITED STATES PATENT OFFICE 2,643,330

PULSE INTERVAL TIME DIVISION SYSTEM

Paul W. Borgeson, Little Falls, N. J., assignor to Raytheon Manufacturing Company, Newton, Mass., a corporation of Delaware Application September 12, 1950, Serial No. 184,422

4 Claims. (Cl. 250—27)

This invention relates to automatic time division of signal pulse intervals.

For applications such as pulse time communication systems, television transmitters and receivers, radar ranging relays, time measurements and the like, it often becomes desirable to divide a relatively constant period between incoming pulses into a selected number of sub-periods.

Pursuant to the present invention such a time-division system is provided which also succeeds in incorporating particularly desirable characteristics for a system of this type. Among them are the ability to retain for a length of time previous information regarding the incoming period, ability to work through a relatively large amount of spurious input information, automatic control for changes in time of occurrence and period of the incoming information, equality of sub-periods, ability to synchronize automatically, and easily made adjustments.

These and other objects, features and advantages of the invention will become more apparent from the following description taken in connection with the accompanying drawings wherein:

Fig. 4 is a circuit diagram of suitable count down multivibrator, cathode follower and differentiating circuits for use in Fig. 1;

Fig. 5 is a circuit diagram of a suitable count down blocking oscillator and diode circuit for use in Fig. 1.

Figure 1:
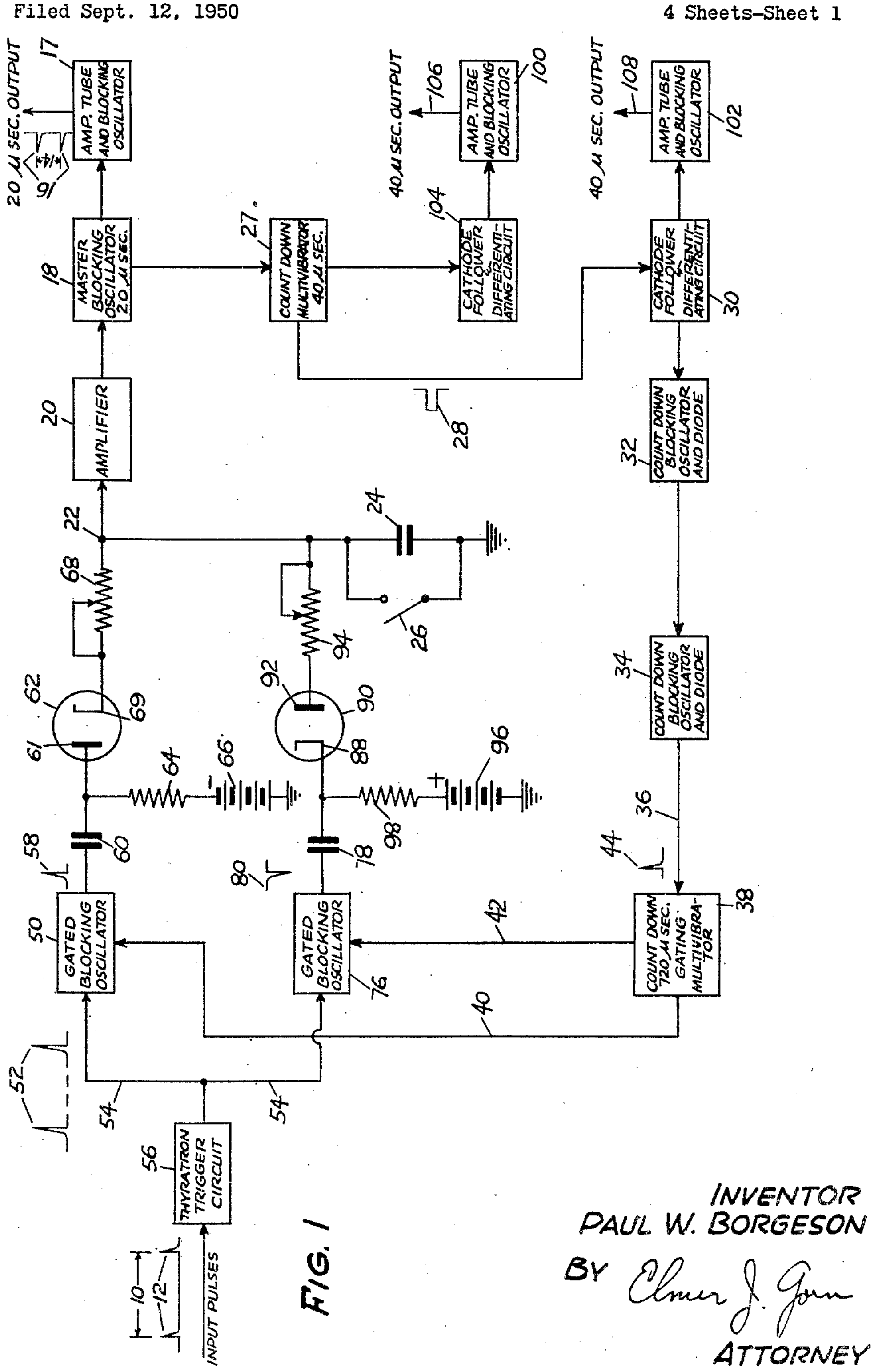
Fig. 1 is a partially block and partially schematic diagram of one embodiment of the invention.

Referring to the drawings, the present embodiment of the invention, for purposes of clarity in illustration, is particularly adapted to divide the period 10 between input pulses 12 into thirty-six equal divisions. However, where desired, the system to be hereinafter described may be used equally well for other time division rates by suitable variation of circuit constant.

If the interval 10 between pulses 12 is 720 microseconds, division into thirty-six equal intervals will result in a desired twenty microsecond interval 14 between output time division pulses 16 from an output amplifier tube and blocking oscillator circuit 17. To obtain this output pulse interval, the output circuit 17 is triggered by a free-running frequency controlled oscillator, such as a free-running blocking oscillator 18, which is used as the master and preferably having a free-running period approximately that of the selected period 14. The master blocking oscillator 18 has its oscillation frequency controlled by the voltage from a conventional amplifier circuit 20 which is determined by the voltage at point 22 from a charge on capacitor 24 when switch 26 is open. Exemplary circuits 17, 18 and 20 are shown and described with reference to Fig. 6. However, other circuit arrangements may be used equally well. The charge on the capacitor 24 is, in turn, made to depend on two primary factors, namely, the pulse rate from the master blocking oscillator 18 and the period 10 of the synchronized pulses 12. The pulse rate is made to influence the charge on the voltage control condenser 24 by causing the triggering or operation of a suitable count down circuit 27, such as a bistable multivibrator which may be similar to the multivibrator illustrated and hereinafter described with regard to Fig. 4. The multivibrator 27, in turn, causes square wave pulses 28 at half the rate of pulses from the master blocking oscillator 26 to feed a suitable cathode follower circuit 30 as, for example, illustrated and described with regard to Fig. 4. The square wave is then differentiated at the circuit 30 and applied to series count down circuits 32 and 34 which may be step down diode circuits and blocking oscillators, as illustrated and described with reference to Fig. 5, in this instance with a circuit constant to give a three to one count down ratio for each. Triggering pulses 44 will appear in output line 36 from the count down circuit 34 at one eighteenth the rate of pulses generated by the master blocking oscillator 18 and having an interval of eighteen times the interval between pulses 16. These pulses trigger a suitable gating circuit, such as a bistable multivibrator 38, which effects a further count down to a gating cycle of thirty-six times the interval between pulses 16. The multivibrator 38 may be similar to that shown and described with reference to Fig. 3. Lines 40 and 42 may each, respectively, be from an anode of the two operating multivibrator tubes contained in such multivibrator circuit. Thus each time a pulse 44 (Figs. 1 and 2) occurs in line 36 the multivibrator 38 is triggered to operate so as to cause a gating potential pulse picture in lines 40 and 42, as shown by curves 46 and 48 (Fig. 2), respectively. Line 40 is coupled to a gated blocking oscillator 50 in a manner such that any pulse 52 appearing in line 54 from a suitable thyratron trigger circuit 56 during the positive portion of the gating pulse 46 will appear as positive pulse 58 through condenser 60 at the anode 61 of a unidirectional current valve 62, such as a diode. The diode 62 is suitably biased through a resistance 64, as by a battery 66, so as to normally maintain diode 62 nonconductive. The appearance of the positive pulse 58 through condenser 60 overcomes this bias and causes conduction in diode 62 and through the adjustable resistance 68 which is connected between cathode 69 of diode 62 to charge the condenser 24 with the side 22 of the condenser 24 positive with respect to ground. Uniformity of the size of pulses 52 is insured by the thyratron trigger circuit 56. However, the amount of charge which the pulse 58 will place on the condenser 24 will depend on where along the gating curve 46 (Fig. 2) it occurs. For example, if it occurs along a peak portion 70 (Fig. 2), it will have a maximum charging effect. Along the slope 72 it will have a progressively diminishing charging effect with a minimum charging effect along the minimum portion 74 of the curve 46.

Figure 2:
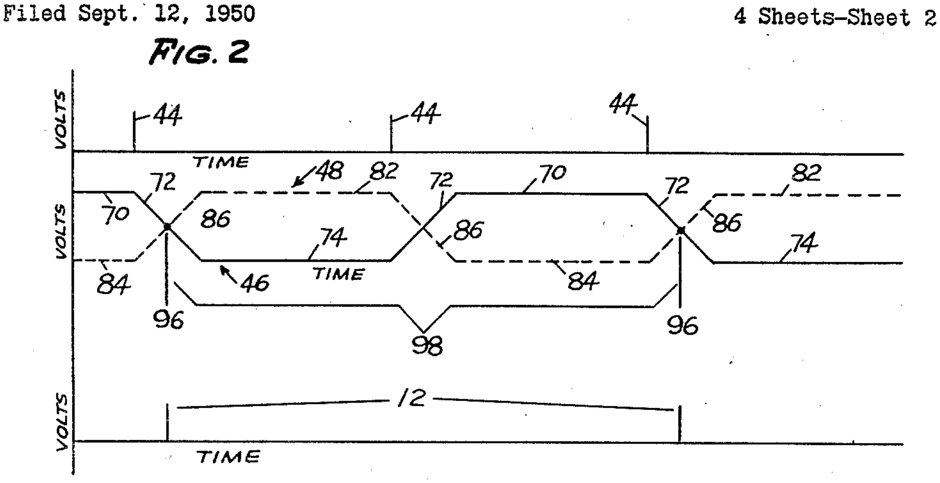
Fig. 2 is a graph of exemplary pulses and gating potentials occurring n the embodiment in Fig. 1 for more clearly illustrating the operation thereof.

The line 42 is coupled to a gated blocking oscillator 76 at which pulses 52 from the thyratron trigger circuit also appear through line 54. The output line from the blocking oscillator 76 to a condenser 78 is taken in a manner that the positive pulse 52 will cause a negative pulse 80 to appear at the condenser 78. The charging effect of the negative pulse 80 appearing at the condenser 78 is dependent, as in the case of pulse 58, upon its position along the gating potential curve 48 (Fig. 2). The pulse 80 will have a maximum negative charging effect along the top portion 82 of gating curve 48, and a minimum negative charging effect along the bottom portion 84 of gating curve 48. The negative charging effect of the pulse 80 will vary between these maximum and minimum values at the slopes 86 of gating curve 48. An exemplary gated blocking oscillator arrangement suitable for this purpose is hereinafter described with reference to Fig. 3.

The negative pulse 80 appears through the condenser 78 at the cathode 88 (Fig. 1) of a unidirectional current valve 90, such as a diode. Anode 92 of the diode 90 is connected through an adjustable resistance 94 to the side 22 of condenser 24. The diode 90 is maintained normally nonconductive by a suitable bias, as from a battery 96, having its positive terminal connected through a resistance 98 to the cathode 88, and its negative terminal connected to ground. The negative pulse 80 overcomes the bias on diode 90 and causes diode 90 to conduct thereby charging the capacitor 24 negatively, as explained above. The size of the negative charge on the capacitor 24 effected by the pulse 80 may be further controlled by the adjustment on resistor 94.

It will be noted that, for each pulse 52 from the thyratron trigger circuit 56 and therefore for each input pulse 12, a positive charging pulse 58 and negative charging pulse 80 will appear to charge the control capacitor 24, as explained above. As already explained, the effective charging amplitudes of these pulses will be dependent upon their position along the gating potential curves 46 and 48. It should also be noted that their respective charging amplitudes vary inversely to each other on these gating potential curves. That is, when pulse 80 has a maximum negative charging amplitude as along the top portion 82 of the gating curve 48, the pulse 58 has a minimum positive charging amplitude since it will occur along the bottom portion 74 of curve 46. Thus here the net charge on capacitor 24 is negative. A negative charge on capacitor 24 causes the potential at point 22 to go negative by the same amount. This negative-going potential is amplified by the amplifier 20 to a suitable level and appears at the master blocking oscillator 18 causing an increase in its pulse rate. The pulses 28 and 44 will therefore occur more frequently and the period of the gating pulses 46 and 48 will thereby be decreased.

On the other hand, if pulses 52 and therefore pulses 58 and 80 occurred at the portions 70 and 84, respectively, of gating curves 46 and 48, the net charge on the capacitor 24 would be positive. This causes point 22 to go positive which, in turn, after suitable amplification by the amplifier 20, would cause a decrease in frequency of the oscillations of the master blocking oscillator 18. This would produce less frequent pulses 28 and 44 which, in turn, would result in a longer period for the gating potential curves 46 and 48. The effect of this lengthened and shortened gating period is to shift the relative position of the input pulses 12 to the left or right, respectively, along the gating curves 46 and 48.

The variable resistances 68 and 94 are preferably mechanically connected so that the resistances are essentially equal at all times. The voltage obtained from either battery 66 or 94 may be varied to equalize the effects of the pulses 58 and 80 when they occur at point 96. Resistances 68 and 94 are varied to obtain the optimum comprise between noise immunity and time of response to change in the incoming signal 12.

When the period 98 of the gating potential curves 46 and 48 is exactly equal to the interval 10 between input pulses 12, the pulses 12 will occur at a time relation coinciding with the points 96 where charging pulses 58 and 80 neutralize each other and master blocking oscillator is oscillating so as to produce pulses 16 at exactly thirty-six times the rate of pulses 12.

Automatic compensation also occurs for changes in the period 10 of input pulses 12. For example, if the incoming period 10 increases slightly, the pulses 58 and 80 will occur somewhat later with respect to the multivibrator gating curves 46 and 48, and will change the charge on capacitor 24 in small steps to reach the correct control voltage to produce the exact thirty-six output pulses 16 within this increased interval.

It is thus seen that an automatically self-corrective servo loop is achieved in Fig. 1 whereby time division of the interval between the input synchronized pulses 12 is obtained.

Other time division rates may be obtained simultaneously from the apparatus in Fig. 1 by adding additional blocking oscillators 100 and 102 triggered from suitable amplifier tubes connected to cathode follower and differentiating circuits 104 and 30, respectively. The circuit 104 may also be similar to that hereinafter described with reference to Fig. 4. By connecting the cathode follower circuit 104 to the anode of one of the operative tubes of the multivibrator 27, and the cathode follower 30 to the anode of the other of the operative tubes of the multivibrator 27, forty microsecond interval outputs 106 and 108 differing from each other by twenty microseconds are obtained.

The cathode followers in circuits 104 and 30 are inserted primarily to isolate the output triggered blocking oscillators 100 and 102 from interfering with operation of the multivibrator 27.

In general operation, since the natural period, that is, when no charge is on the condenser 24, is approximately thirty-six times that of the synchronized pulses 12, the pulses 58 and 80 will, from the start, occur along the slopes 72 and 86, respectively. The corrective action will therefore, in general, be confined to the slopes 72 and 86 in seeking out the neutral point 96. The amount of seeking and speed of corrective response may be controlled by varying circuit constants in accordance with conventional servo mechanism principles.

Figure 3:
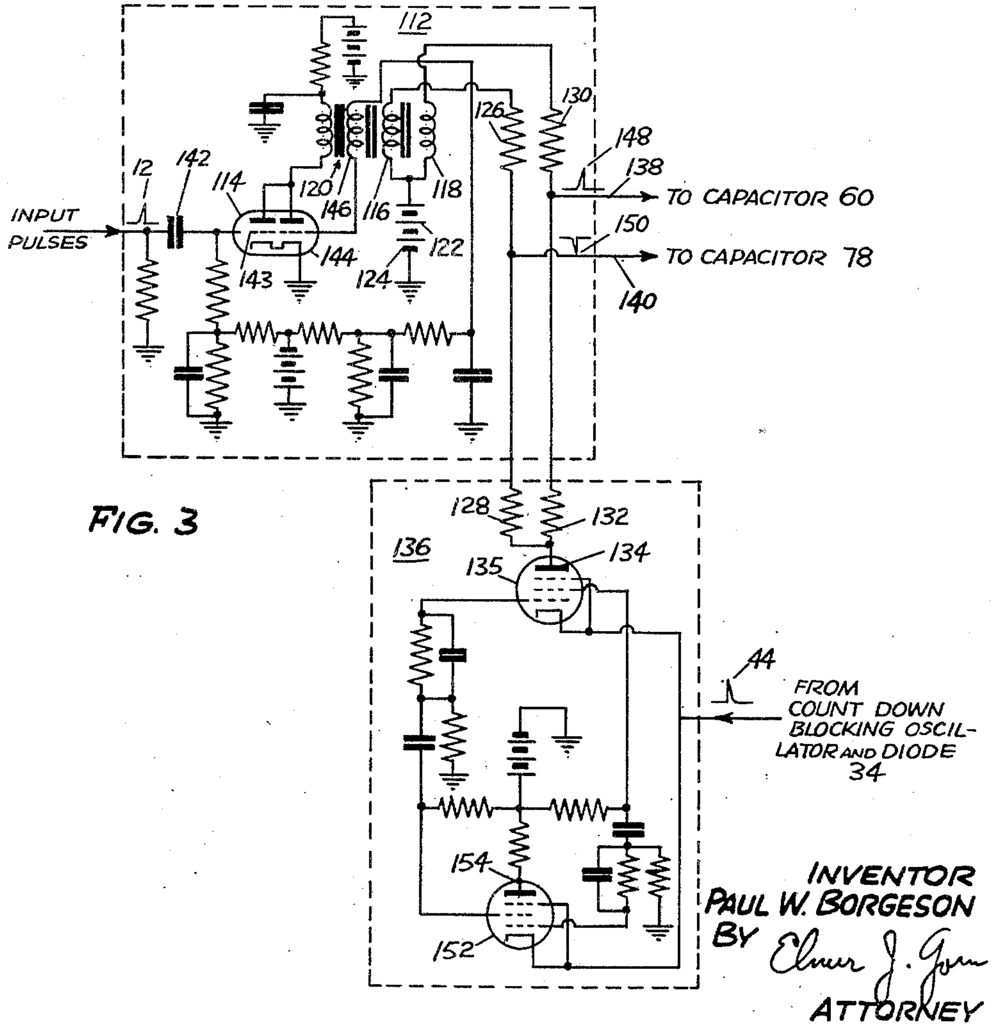
Fig. 3 is a schematic view of an alternate construction for a portion of the embodiment in Fig. 1.

Since the diodes 62 and 90 feeding capacitor 24 are biased well below conduction unless a pulse 58 and 80, respectively, is applied, the discharge time of the capacitor 24 will be determined by parasitic circuit elements, such as capacitor leakage, gas currents and the like. Thus the control voltage across the capacitor 24 will change relatively slowly under conditions of loss of incoming information.

Where such operating conditions as high temperature variations occur to disturb the constancy of operation of gas-filled tubes, as the thyratron in the thyratron trigger circuit 56, it may be replaced by a blocking oscillator 112 triggered through an amplifier tube 114, Fig. 3. In this case, the blocking oscillator 112 replaces not only thyratron trigger circuit 56, but also the gated blocking oscillators 50 and 76. To accomplish this, one end of the third and fourth windings 116 and 118, respectively, of the transformer 120 of the blocking oscillator 112 is connected to the positive terminal of a potential source, as battery 122. The negative terminal 124 may be connected to ground. The other ends of windings 116 and 118 are led through voltage divider resistances 126, 128 and 130, 132, respectively, to anode 134 of operating tube 135 in a multivibrator count down circuit 136, which may be the multivibrator circuit 38 (Fig. 1). Lines 138 and 140 are led from suitable pickoff points between resistances 130, 132 and 126, 128, respectively, to capacitors 60 and 78 (Fig. 1), respectively, in the unidirectional charging circuits for control capacitor 24. Thus when an input pulse 12 occurs through capacitor 142 at grid 143 of the triode 114, it causes a progressive build-up in the transformer 120 due to feedback of the secondary winding 146 so that the blocking oscillator 112 induces a resulting positive pulse 148 through winding 118 and resistance 130 in line 138. In similar manner, negative-going pulse 150 is induced through winding 116 and resistance 126 in line 140. The charging effect of the pulses 148 and 150 on control capacitor 24 will depend upon the gating potential in lines 138 and 140 due to the operation of the multivibrator 136.

When the operating tube 135 of the multivibrator 136 is conductive, the potential at anode 134, and therefore in lines 138 and 140, drops. Its effect is to increase the negative charging effect of pulse 150 and reduce the positive charging effect of pulse 148. The charge on control condenser 24 will be caused to go negative. Inversely, when the operating tube 135 is non-conductive, the potential of anode 134, and therefore lines 138 and 140, rises. The result is a decrease in negative charging effect of the negative pulse 150, and the positive charging effect of pulse 148 is increased. In such case, the charge on the control condenser will be caused to go positive. Along the gating slope between these two extremes, progressively decreasing charging effects occur until a neutral charging point is reached where no resulting charging effect occurs. The potential picture in lines 148 and 150 will be similar to that of curve 46 with the neutral point just mentioned being preferably at point 96 (Fig. 2).

Since the multivibrator 136 is of the bistable type, its period is determined by the pulses 44 from the count down blocking oscillator and diode circuit 34. Each time a pulse 44 appears in line 152, the operating tube 135 will be caused alternately to be made conductive and non-conductive in opposite relation to the other operating tube 152 of the multivibrator 136. Automatic seeking of the neutral point 96 and servo operation will be similar to that explained with regard to Fig. 1.

As hereinabove mentioned, the gated blocking oscillators 50 and 76 in the embodiment in Fig. 1 may be similar to the blocking oscillator 112, Fig. 3. Also, count down gating multivibrator 38 may be similar to the multivibrator 136, Fig. 3. In the embodiment in Fig. 1, however, instead of coupling the third and the fourth windings 116 and 118, respectively, of the pulse transformer 120 both to the anode 134 of the multivibrator 136, only one of the windings, as winding 118, is coupled through resistances 130 and 132 to the anode 134. Such arrangement would represent the gated blocking oscillator 50 in Fig. 1. For the circuit 76 another blocking oscillator similar to 112 may be used having in this instance its third winding 116 connected through resistances 126 and 128 to anode 154 of the operating tube 152 of the multivibrator 136. Thus when the potential at anode 134, and therefore in output line 138, is low, the potential at anode 154, and therefore in output line 140, will be high and the circuit will otherwise function as explained with regard to blocking oscillators 50 and 76 in Fig. 1.

Suitable count down multivibrator 27 and cathode follower and differentiating circuits 30 are illustrated in Fig. 4. In the multivibrator circuit 27, a twin triode tube 156 is used to provide the two operating triodes 158 and 160 with a common cathode 162 connected through resistance 164 to ground, and to which is also connected the input line 166 from the master blocking oscillator 18. The anodes 168 and 170 are led through resistances 172 and 174 to a common positive terminal of a power source, such as battery 176, the negative terminal of which is connected to ground. Feedback is provided from anode 168 of triode 160 through a grounded capacitive resistive network 178 to grid 180 of triode 158. Feedback for anode 170 is provided through another grounded capacitive resistive network 182 to grid 184 to triode 160. Circuit constants are such that the operation will be stable with either of triodes 160 or 158 conducting. Each time a pulse 186 appears in line 166 from the master blocking oscillator 18, it causes a switching action which extinguishes the triode which is conducting and results in conduction in the triode which was nonconductive. This switching action produces in line 188, running from anode 168 to the cathode follower circuit 30, the square wave pulse 28. The square wave pulse 28 represents two pulses 186, the first pulse 186 forming the leading edge 190 of the square wave pulse 28, and the second pulse 186 forming the trailing edge 192 of the square wave pulse 28.

Line 188 is connected through a capacitor 194 to the grids 196 of a twin triode 198 having a common cathode 200 connected through resistance 202 to ground. The common cathode 200 is connected to a differentiating circuit formed by capacitance 204 and grounded resistance 206 in output line 208. The grids 196 of the twin triodes 198 are also connected through a resistance 210 to the positive terminal of a power source, such as battery 212, whose negative terminal is grounded. The grids 196 are also grounded through a resistance 214. Anodes 216 of the twin triodes 198 are also connected to the positive terminal of battery 212.

The square wave pulse 28 in line 188 appears through capacitor 194 at grids 196 causing a corresponding square wave pulse picture at the common cathodes 200. This pulse is differentiated by the capacitor 204 and grounded resistance 206 so as to appear in output line 208 as a positive pulse 218 corresponding to the leading edge 190 of pulse 28 and a negative pulse 220 corresponding to the controlling edge 192 of square wave pulse 28.

The cathode follower and differentiating circuit 30, as described with regard to Fig. 4, is also suitable for use directly in the cathode follower and differentiating circuits 104 in Fig. 1.

A suitable count down blocking oscillator and diode circuit for use in circuits 32 and 34 of Fig. 1 is illustrated in Fig. 5. It consists essentially of a conventional blocking oscillator circuit 222 and a diode step charging circuit 224. The blocking oscillator circuit has a twin triode 226 having a common cathode 228 connected to ground. Its anode 230 is connected through the primary winding 232 of a pulse transformer 234 and through a resistor 236 to the positive terminal of a power source, such as a battery 238, whose negative terminal is connected to ground. A point between resistor 236 and the primary winding 232 is connected through a capacitor 240 to ground. Grids 242 of the twin triode 226 are connected through secondary winding 244 of pulse transformer 234 and through capacitors 246 and adjustable resistance chain 248 to the negative terminal of a power source, such as battery 250, having its positive terminal connected to ground. Grids 242 are also connected through a condenser 252 to a point 254 between capacitors 246 and adjustable resistance chain 248. Point 254 is connected through capacitor 256 to ground. Diode 258 is connected with its cathode 260 to a point between capacitors 246 and winding 244 of pulse transformer 234. Anode 262 of diode 258 is connected to a point between capacitor 252 and point 254. The positive pulse 218 appearing from line 208, Fig. 4, through capacitor 264 at anode 262 will cause the diode 258 to conduct and thereby charge the capacitors 246. The negative pulse 220 will have no effect on diode 258 and therefore will have no effect in the charge on condenser 246. Each time a pulse 218 occurs, it will charge the condenser 246 by a small amount in stepped fashion, as shown by curve 266. The potential setting at the adjustable resistance chain 248, due to battery 250, is such that, when the peak 268 is reached in each third charging step, the potential at grid 242 triggers a blocking oscillator 222 causing it to produce an output pulse 270 in line 272 from the third and fourth windings 274 and 276, respectively, in the pulse transformer 234.

The operation just described is where the circuit in Fig. 5 is used as the count down blocking oscillator and diode circuit 32. Where the circuit in Fig. 5 is used for the count down blocking oscillator and diode circuit 34, the input pulses to circuit 34 will be the pulses 270, Fig. 5, which will appear at the capacitor 264. In that case, the output pulses in line 272 will be the positive pulses 44 which are then applied through line 36 to the count down gating multivibrator circuit 38.

Figure 6:
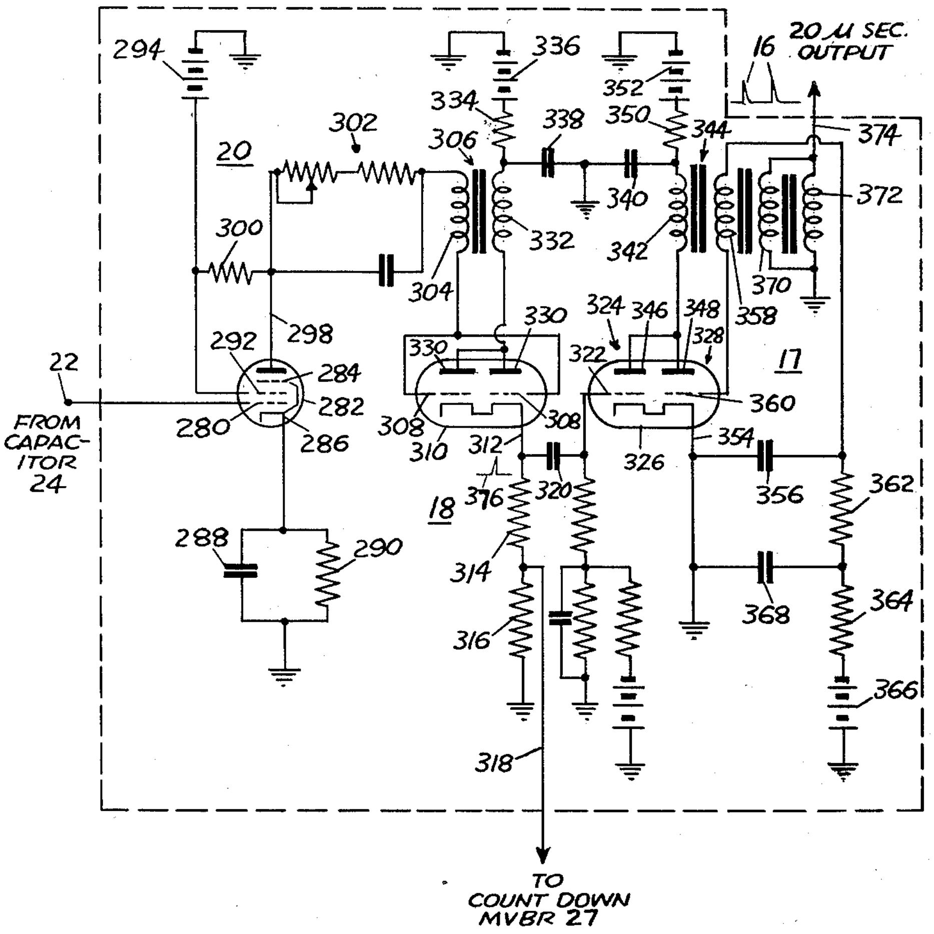
Fig. 6 is a circuit diagram of suitable amplifier, master blocking oscillator, and amplifier tube and master blocking oscillator circuits in Fig. 1.

A suitable amplifier circuit 20, master blocking oscillator circuit 18, and amplifier tube and blocking oscillator circuit 17 are shown in Fig. 6. The potential at point 22 from the capacitor 24 is made to appear at grid 280 of a pentode 282 having a suppressor grid 284 tied back to a cathode 286 which is connected through a parallel-connected capacitor 288 and resistor 290 circuit to ground. Screen grid 292 of the pentode 284 is connected to the positive terminal of a potential source, such as battery 294, whose negative terminal is connected to ground. Anode 298 of the pentode 282 is connected through resistance 300 to the positive terminal of the battery 294 and through a variable resistive and capacitive network 302 and primary winding 304 of a pulse transformer 306 to grids 308 in twin triodes 310 of the master blocking oscillator circuit 18. Common cathodes 312 of the twin triodes 310 are connected through resistors 314 and 316 to ground. Output line 318 leading to the count down multivibrator circuit 27 is taken from a point between the voltage divider resistances 314 and 316. The common cathodes 312 of the twin triodes 310 are also connected through a capacitor 320 to grid 322 of an amplifier triode 324 in the twin triode tube 326 also containing the triode 328 in the amplifier tube and blocking oscillator circuit 17. The triode 324 provides the amplifier tube referred to in the title of the circuit 17. Anodes 330 of the twin triode tube 310 are connected through secondary 332 of the pulse transformer 306 and through a resistor 334 to the positive terminal of a power source, such as a battery 336, having its negative terminal connected to ground. A point between the resistor 334 and transformer secondary 332 is connected through series-connected capacitors 338 and 340 and through primary winding 342 of a pulse transformer 344 in the blocking oscillator circuit 17 to the anodes 346 and 348 of the triodes 324 and 328, respectively, in the twin triode tube 326. The point between capacitors 338 and 340 is grounded, and a point between capacitor 340 and the primary winding 342 of the pulse transformer 344 is connected through resistor 350 to the positive terminal of a potential source, such as battery 352, the negative terminal of which is connected to ground. The twin triodes 326 have a grounded common cathode 354, which is also connected through capacitor 356 and secondary 358 of the pulse transformer 344 to grid 360 of the triode 328. A point between secondary winding 358 and capacitor 356 is connected through voltage divider resistances 362 and 364 to the negative terminal of a power source, such as a battery 366, the positive terminal of which is connected to ground. The common cathode 354 is also connected through a capacitor 368 to a point between voltage divider resistances 362 and 364. Third and fourth windings 370 and 372 of the pulse transformer 344 have one of their respective ends connected to a common ground and the other of their respective ends connected to the output line 374 providing the twenty microsecond output shown in Fig. 1 at the amplifier tube and blocking oscillator 17.

In operation, the potential at point 22, and therefore at control grid 280, is amplified to a suitable level by amplifier tube 282 as determined by the setting on the adjustable resistance chain in the capacitive resistive network 302 so as to control the rate of oscillation of the free-running oscillator 18. Oscillation of the free-running oscillator 18, as controlled by this potential, causes pulses 376 to appear in the cathode line 312 at a rate determined by this controlled potential. The pulses 376 appear through resistor 314 in output line 318 and through output line 318 at the count down multivibrator 27 to cause the multivibrator 27 to operate as described above. Pulses 376 also appear through capacitor 320 at grid 322 of the amplifier tube 324 so as to trigger the amplifier tube and blocking oscillator circuit 17 causing it to emit pulses 16 through line 374 as described with regard to Fig. 1.

The amplifier tube and blocking oscillator 17 illustrated in Fig. 6 is also suitable for use directly in the amplifier tube and blocking oscillator circuits 100 and 102. When used in the circuits 100 and 102, the amplifier tube 324 will be triggered by the positive pulses 218 from the cathode follower and differentiating circuits 104 and 30, respectively, as described in connection with Fig. 4.

This invention is not limited to the particular details of construction, and processes described, as many equivalents will suggest themselves to those skilled in the art. It is accordingly desired that the appended claims be given a broad interpretation commensurate with the scope of the invention within the art.

What is claimed is:

1. A system for dividing the interval between electrical input pulses of substantially constant interval comprising means for producing electrical output pulses at a rate determined by a control voltage, a capacitor in voltage control relation to said output pulse producing means, two unidirectional current means responsive to said input pulses for charging said capacitor, one of said current means for charging said capacitor positively and the other of said current means for charging said capacitor negatively with respect to a selected reference value, a gated blocking oscillator coupled to each of said current means and in pulse responsive relation to said input pulses, and means responsive to said output pulses for gating said blocking oscillators in a manner to vary the charge of said input pulses on said capacitor in accordance with the deviation from a selected ratio of the rate of said output pulses to said input pulses and thereby effect a return of said ratio to the selected value.

2. A system for dividing the interval between electrical input pulses of substantially constant interval comprising means for producing electrical output pulses at a rate determined by a control voltage, a capacitor in voltage control relation to said output pulse producing means, two unidirectional current means responsive to electrical pulses for charging said capacitor, one of said current means for charging said capacitor positively and the other of said current means for charging said capacitor negatively with respect to a selected reference value, a gated blocking oscillator coupled to each of said current means, a thyratron trigger circuit responsive to said input pulses and in pulse producing relation to said gated blocking oscillators for producing said electrical pulses for said unidirectional current means, and means responsive to said output pulses for gating said blocking oscillator and thereby controlling the resulting charge on said capacitor from said current means in accordance with the ratio of the rates of said output and input pulses.

3. A system for dividing the interval between electrical input pulses of substantially constant interval comprising means for producing electrical output pulses at a rate determined by a control voltage, a capacitor in voltage control relation to said output pulse producing means, two unidirectional current means for charging said capacitor, one of said current means for charging said capacitor positively and the other of said current means for charging said capacitor negatively with respect to a selected reference value, a blocking oscillator responsive to said input pulses for causing charging pulses in said unidirectional current means, and means responsive to said output pulses for gating said blocking oscillator and thereby controlling the resulting charge on said capacitor from said current means in accordance with the ratio of the rates of said output and input pulses.

4. A system for dividing the interval between electrical input pulses of substantially constant interval comprising means for producing electrical output pulses at a rate determined by a control voltage, a capacitor in voltage control relation to said output pulse producing means, two unidirectional current means for charging said capacitor, one of said current means for charging said capacitor positively and the other of said current means for charging said capacitor negatively with respect to a selected reference value, a blocking oscillator arranged to cause for each of said input pulses a positive charging pulse in said positively charging current means and a negative charging pulse in said negatively charging current means, and means responsive to said output pulses for gating said blocking oscillator and thereby controlling the resulting charge on said capacitor from said current means in accordance with the ratio of the rates of said output and input pulses.

PAUL W. BORGESON.

References Cited in the file of this patent

UNITED STATES PATENTS

| Number | Name | Date |
|---|---|---|
| 2,277,000 | Bingley | Mar. 17, 1942 |
| 2,450,360 | Schoenfeld | Sept. 28, 1948 |
| 2,490,500 | Young | Dec. 6, 1949 |